3,389,021
PROCESS FOR PREPARING STEEL FOR COLD WORKING
Charles G. Easter, Burlington, Ontario, and Allan B. Dove, Hamilton, Ontario, Canada, assignors to The Steel Company of Canada, Limited, Hamilton, Ontario, Canada, a corporation of Canada
Filed Oct. 7, 1964, Ser. No. 402,691
5 Claims. (Cl. 148—12)

This invention relates to processing and preparing steel rod for cold working operations, such as wire drawing, bolt forming, or the like. More particularly, this invention relates to a combination of process steps wherein steel rod issuing from a rod rolling mill is cooled in a particular way to form a special scale on the surface of the rod, and the rod is thereafter packaged in such a way that the special scale can be removed, and the rod thereafter can be cleaned, coated and mounted for cold working operations under conditions in which substantial savings in materials and handling can be made.

During the production of steel rod for cold working, a substantial loss of steel results from the formation of scale on the surface of the steel during and after the rod rolling operation. The formation of scale is, of course, greatly accelerated during periods in which the steel is exposed to air at the elevated temperatures necessary for rolling. Subsequent to rolling, scale also forms on the rolled steel rod while it is cooling down from the rolling temperature, and since the rod in normal practice is collected into compact bundles while it is still relatively hot, the scale builds up substantially more in the interior of the bundle where the heat remains longest. Also, in normal practice, such bundles of steel rod in the high carbon range (.38% carbon or better) are subjected to an "air patenting" operation which again subjects the rod to elevated temperatures and further scale loss. During "air patenting," however, a substantial portion of the previously formed scale is cracked off in a somewhat crude descaling operation which results from unwinding the rod as it enters the "air patenting" furnace. Since this does not remove all the scale, the result is to leave the rod with a non-uniform surface having patches of the original scale still remaining, and during "air patenting" the original scale increases in thickness and magnetite content and the remaining areas acquire a new layer of scale.

Because of the thickness and non-uniformity of the scale of the conventional rod, in order to accomplish effective descaling, rinsing and cleaning, it has been necessary in the past to completely destrap the bundle and to spread the rod out on an arm so that the acid of the pickling bath, the rinse water and the coating solutions can have adequate access to the rod surface. It will be noted also that, in the conventional process, once a given portion of the surface of the rod has become freed of scale by the acid solution, it is thereafter a distinct disadvantage to let that portion of the rod remain in the acid because the acid then attacks and pits the bare steel surface. On the other hand, there is no way to avoid such extra acid corrosion of the steel because all scale must be removed, and the rod must remain in the acid until the most tenacious portion of the scale has been penetrated and released from the steel by the acid.

Another disadvantage in the conventional process has to do with the chemical composition of the scale. In general, the scale comprises three forms of iron oxide; i.e., red iron oxide (hematite $Fe_2O_3$), black oxide (magnetite $Fe_3O_4$), and grey oxide (Wüstite $FeO$). The proportions of these components present in the scale are usually $Fe_2O_3$ (0-5%), $Fe_3O_4$ (20-40%), and $FeO$ (60-80%). When the rod cools at a slow rate, as in the conventional process, in addition to a general build-up of the thickness of scale due to continued exposure to air at high temperatures, another disadvantage arises from the fact that the Wüstite (FeO) transforms at this temperature to magnetite ($Fe_3O_4$) roughly in accordance with the following equation:

$$4FeO \rightarrow Fe_3O_4 + Fe$$

Since the magnetite ($Fe_3O_4$) is almost insoluble in sulphuric acid [the Wüstite (FeO) being readily soluble in acids], the proportionate increase of magnetite in the conventional process is a distinct disadvantage.

In addition to chemical composition, however, the physical nature and location of the various components of the scale is also important. With normally cooled rod, the scale is relatively thick and has good adherence to the rod with a portion of the magnetite ($Fe_3O_4$) adjacent to the steel. Photomicrographs show substantial portions of the scale on conventionally cooled rod are solid and relatively impervious to quick acid penetration. When such normally cooled rod is thereafter "air patented," a large part of the original scale is removed, but some parts of it still remain. Thereafter, during "air patenting" the thickness of the original scale increases and a further growth of the magnetite takes place, while new scale forms on the remaining areas. The thick parts of the scale are particularly difficult to remove thereafter by acid treatment, and the result is to leave a surface which is eroded and to some extent pitted by the acid in the areas more readily exposed to the acid.

According it is a general object of this invention to provide a process in which the rod is cooled in such a way that the formation of scale on the surface of a rod is maintained under relatively uniform conditions in which the transformation of Wüstite to magnetite is minimized, the thickness of the scale is held to a uniform minimum along the entire length of the rod, physically the scale is friable and has a crazed surface replete with tiny cracks suitable for rapid penetration of acid, and suitable for being bundled in such a way that the entire scale removing, rinsing and rod coating operations can be carried out without unstrapping the bundle.

In the accomplishment of this general object of this invention in a preferred embodiment thereof, a quenching operation is employed in direct sequence with a rod mill such as described in the copending application of one of the present inventors, Ser. Nos. 219,220, now abandoned, and 282,939, now Patent No. 3,320,101, the teachings of which are incorporated herein by reference. By this process a billet of steel is rolled into a rod and after leaving the final finishing stand of the rod mill, it is passed into a delivery pipe in which it is subjected to a water quenching step which brings the temperature of the rod down to approximately 1450° F. Following the water quenching step, the rod is deposited on a conveyor in substantially concentric overlapping rings which are offset longitudinally due to the motion of the conveyor. The conveyor comprises a relatively open framework and while the rod is moving forward along it, air is applied to quench substantially uniformly all portions of the rod to approximately 700° F. within one to four minutes depending upon the speed of the conveyor and the cooling conditions desired. During these quenching steps an extremely uniform, thin and good scale is produced having a remarkably low percentage of magnetite in it. In addition, the scale surface is crazed and thoroughly broken by microscopic cracks or fissures which permit ready access of the "pickling" acid to the metal base during the subsequent descaling operations.

After the rod has been cooled to about 700° F. at which temperature it is relatively stiff and hard, it is collected into a compact bundle in which the offset rings of lesser diameter than the bundle are compressed longitudinally and held in place by straps. In this condition of individual bundles weighing from about 600 lbs. to 1200 lbs., or in composite bundles weighing 6000 lbs. or more, the rod is then carried through the steps of pickling, rinsing, "smut removing" and coating with soap, lubricants, oxides, borax, etc., prior to cold working.

It is a feature of this invention that the strapped bundles, having been collected into bundles from slightly offset concentric rings of cold and relatively stiff rod, present an unusually open bundle structure which is highly suitable for pickling, rinsing and cleaning operations without destrapping, which results in a considerable savings in material and handling costs. In addition, the manner of collection also results in a bundle from which the rod rings pay-off smoothly and without interference.

It is a further feature of this invention that the rod produced in sequence with the rod rolling mill and rapidly quenched thereafter with the quenching fluid having access to substantially the entire surface of the rod, produces such a thin and uniform scale of optimum chemical composition that descaling can be done subsequently thereto with the rod packaged in a fully strapped bundle.

Further objects and features of this invention will best be understood and appreciated from the following detailed description of a preferred embodiment of the invention, selected for purposes of illustration, and shown in the accompanying drawings, in which.

Figure 1:
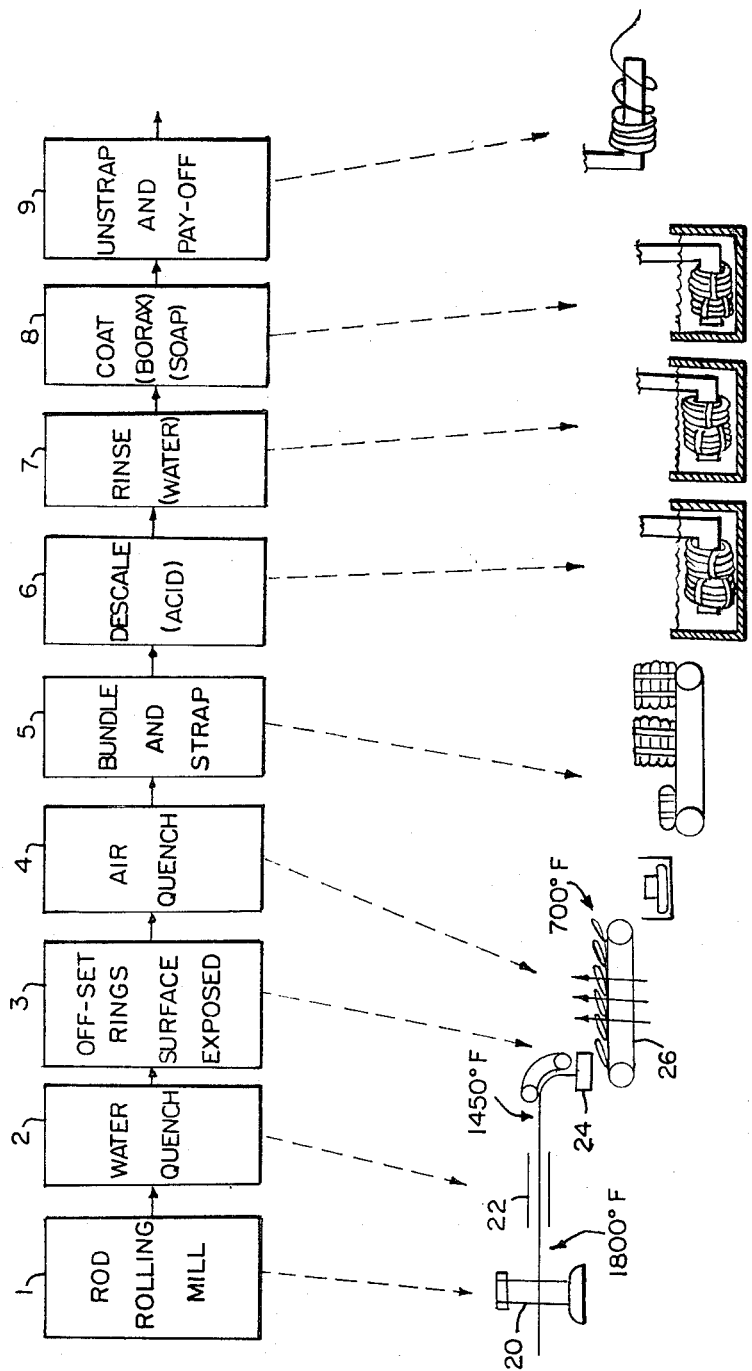
FIG. 1 is a flow diagram indicating both schematically and in block form the steps involved in the practice of the invention.

The preferred embodiment of this invention herein shown with the numbered steps in FIG. 1 is as follows.

STEP 1

A billet of steel is rolled into a rod. No limitation is contemplated with respect to the size and type of rod, although the practice of the invention has only been performed hitherto with standard grades of steel rod. The step of rolling the rod is a primary step in the process because it defines the starting temperature and surface conditions for the rod; that is, the rod is freshly rolled, still relatively free of scale, and still at a temperature above that at which the allotropic transformation of the austenite starts to occur.

STEP 2

Once the rod issues from the final finishing strand of the rod mill, indicated at 20 in FIG. 1, it passes through a delivery pipe 22, where it is subjected to the quenching action of water. The temperature of the rod as it leaves the finishing stand is approximately 1800° F. and after it leaves the delivery pipe, it is down to approximately 1450° F.

STEP 3

Following the delivery pipe, the rod is passed through a laying head 24, which rotates and deposits the rod in substantially concentric rings onto a conveyor 26. The rings are not precisely concentric for several reasons. First, the conveyor 26 is moving along, and therefore, each ring is slightly offset from the next one by the amount the conveyor 26 moves between each rotation of the laying head 24. In addition, purposely the speed of oscillation may be varied, or the height of the laying head, or the position of the conveyor, in order to obtain further non-uniformity in the concentricity of the rings laid on the conveyor. The purpose for the non-uniformity of the concentricity is to further expose the surface of the rod to convective cooling while the rod is passing along on the conveyor to the collecting station. While the use of an open conveyor is regarded as a preferred form in the practice of this invention, it will be understood that other forms of cooling mechanism can also be used at this particular point in the operation. Thus the rod can be laid out on a moving platform and after having been deposited thereon, the platform may be placed in a plenum chamber in which blasts of air, water or other coolants can be applied to the rod in a controlled environment. The said platform can alternatively be immersed into a fluidized bed as is disclosed in Belgian Patent No. 641,694 for the same purpose. The principal point being that the rod in this condition is laid out in such a way that the cooling medium has a substantially ready access to all portions of the surface of the rod, and therefore, the cooling and the scale development can take place uniformly along the entire length of the rod.

STEP 4

While the rod is on the conveyor 26 with its surface thus exposed, it is air quenched from about 1450° F. to about 700° F. in about one to four minutes depending upon the grade of steel being processed and the cooling conditions required.

STEP 5

After cooling, the rod is then compacted into a bundle in which the rod rings are substantially concentric. This collection is done from one end of the dispersed rod to the other and the rod rings are compressed from the offset relation to a relation in which they are nearly all concentric. In this way the bundle formed is substantially open with very few components thereof lying in totally parallel contact, and it also exhibits a tendency to spring back once the straps of the bundle have been severed. Due to the stiffness of the rod, the rings appear to stack around a common axis in progressively offset radial relation. These features of the bundle are important because they promote access of the pickling, rinsing and coating solutions to the interior of the bundle and also promote rapid feeding out of the rod from the bundle without the formation of kinks when the bundle is mounted on an apparatus for drawing or cold forming the rod itself.

STEP 6

Once the rod has been cooled, bundled and strapped, it is then in condition for storage, and subsequent removal of the scale by acid. With the process of this invention, the bundle need not be unstrapped but can be simply dipped into the acid pickling solution. Experience has shown that totally satisfactory descaling takes place at approximately one-half the time involved in conventional descaling operations with a consequent saving in raw steel through acid etching erosion in the readily penetrated areas, a reduction of pits due to acid, and, of course, a reduction in acid consumption. The latter point is particularly important with respect to the pollution of streams because it substantially reduces the amount of spent acid necessary to expel to waste.

STEP 7

After descaling the rod is usually rinsed or may be passed through an operation referred to in the industry as "smut removal." This too is done with the strapped bundle still intact.

STEP 8

Coatings, such as lubricants, soaps, borax, and even metals, are next applied to the rod, and here again the bundle of this invention need not be unstrapped. Some difficulty has been experienced with copper coating with bundles of over 2400 lbs., but otherwise the size of the bundle has not been a problem.

STEP 9

After coating, the rod is then ready for cold working, and since the rod pays-off smoothly and without kinks from the bundle of this invention, the bundle can simply be unstrapped and the rod fed directly into the cold working apparatus.

*Example I*

Figure 2A:
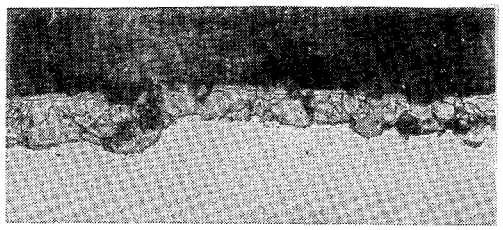
FIGS. 2a and 2b are photomicrographs of the scale formations discussed in Example I.
Figure 2B:

A billet of C-1020 steel was rolled to .391" Rimmed Rod, cooled and bundled in accordance with the foregoing description. A photomicrograph of the resulting scale structure is shown in FIG. 2a wherein it will be seen that the scale contains a multiplicity of tiny cracks. By comparison, FIG. 2b is a photomicrograph of the scale resulting from normal cooling the same rod. In FIG. 2b it will be seen that the physical structure of the scale is more dense and impervious, besides being thicker overall. The normally cooled rod of FIG. 2b took 24 minutes in the acid bath for complete descaling with the bundle spread out on the cleaning arm. By contrast, the rod of FIG. 2a, although still compacted into bundles as above described, was adequately cleaned in 13 minutes even in the areas underneath the straps.

*Example II*

Figure 3A:
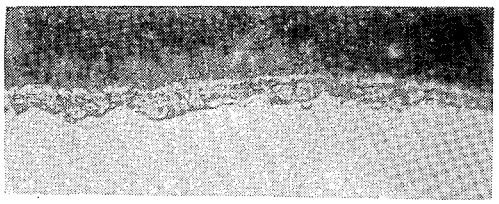
FIGS. 3a, 3b and 3c are photomicrographs of the scale formations discussed in Example II.
Figure 3B:
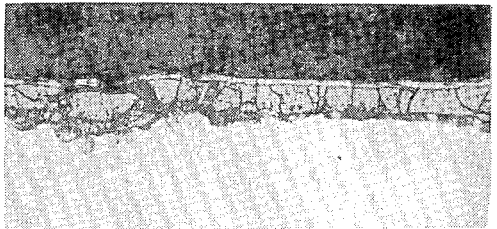
Figure 3C:

Billets of .65/.70C MB Spring Rod were rolled to a diameter of .297". FIGS. 3a, b and c respectively are photomicrographs showing the scale on this rod when processed respectively: (a) in accordance with the present invention; (b) with normal cooling prior to "air patenting"; and (c) with normal cooling and thereafter "air patenting." From these photomicrographs it will be seen that the rod cooled in accordance with this invention has a very thin and uniform scale containing many small cracks; whereas the normally cooled rod prior to "air patenting" shown in FIG. 3b is substantially thicker and not so uniformly cracked; while the scale in FIG. 3c, after "air patenting," is very thick and exhibits a marked growth of the magnetite or black oxide within the scale. Descaling strapped bundles of the rod of FIG. 3a took only 10 to 12 minutes; whereas unstrapped and spread out bundles of the rod of FIG. 3b took 18 minutes and of the rod of FIG. 3c, 20 to 27 minutes.

*Example III*

A quantity of No. 5 rod size, Tieing Wire of .65/.70% carbon (designated H 145628-66C) was drawn and cooled by normal methods, and thereafter "air patented." The rod was then spread on a cleaning arm and dipped into an acid for descaling. 18 minutes were required for it to be completely cleaned and a total scale loss of 1.41% was observed. The same rod was also treated in accordance with this invention and descaled while still in the strapped bundle. Descaling took 13.5 minutes and a total scale loss from beginning to end of 0.171% was observed.

The surface of the rod processed according to this invention and after descaling is unusually smooth and free of pits. As a result it provides an improved rod for cold working and a reduction of the number of breaks occurring during cold working. The smoothness of the surface presents a slight disadvantage in that certain of the standard coatings, such as borax have been noted to spread non-uniformly, in one instance in Tieing Wire for Zigzag Spring. This defect can easily be overcome, however, by the addition of surface active agents, or thickeners or the like to adjust the coating composition to spread more uniformly.

Various further modifications of the preferred embodiments of this invention will now be apparent to those skilled in the art. Thus the water quenching step in the delivery pipe can be omitted or it can even be increased to reduce the temperature even further without departing from the spirit of the invention. Accordingly, it is not intended to confine the invention to the precise form herein shown but rather to limit it in terms of the appended claims.

Having thus described and disclosed preferred embodiments of this invention, what is claimed as new and desired to be secured by Letters Patent is:

1. In a process of producing a descaled hot rolled steel rod of wire drawing quality, the improvement comprising rolling a steel rod at an elevated temperature above the temperature at which allotropic transformation of the austenite starts to occur, collecting said steel rod at said elevated temperature in the form of a series of non-concentric overlapping rings which are not necessarily aligned and which are offset sufficiently to expose substantially all of the surface of said steel rod, rapidly cooling said rod in a controlled manner in an oxidizing cooling medium having free access to said surface to a lower temperature below that temperature where any appreciable change in the metallurgical properties of said steel rod occurs, thus producing a uniform fine friable scale thereon in which the degradation of Wüstite to magnetite is minimal, collecting the steel rod so cooled in the form of a compact bundle, and while the same is still in said compact bundle subjecting the said steel rod to acid descaling.

2. The process of claim 1 wherein said scale has single phase Wüstite bonding to the base metal and the magnetite layer thereof is thin and crazed.

3. The process of claim 1 wherein the collected cooled rod is compressed and strapped into said bundle and the strapped bundle is subjected to said acid descaling.

4. The process of claim 3 wherein after descaling said steel rod while in the form of said strapped bundle is subjected to additional surface treatment.

5. The process of claim 3 wherein the said steel rod in said strapped bundle is in the form of a continuous series of stacked rings of lesser diameter than said bundle which rings encompass a common axis in said bundle and are progressively radially offset around said axis.

References Cited

UNITED STATES PATENTS

| | | | |
|---|---|---|---|
| 2,216,211 | 10/1940 | Nyberg et al. | 134—28 XR |
| 2,218,557 | 10/1940 | Shoemaker | 117—49 |
| 2,275,793 | 3/1942 | Murphy | 117—49 |
| 2,703,550 | 3/1955 | Bell | 117—128 XR |
| 3,231,432 | 1/1966 | McLean et al. | 148—12 |

HYLAND BIZOT, *Primary Examiner.*

DAVID L. RECK, JOHN H. MACK, *Examiners.*

H. F. SAITO, W. W. STALLARD, *Assistant Examiners.*

UNITED STATES PATENT OFFICE
CERTIFICATE OF CORRECTION

Patent No. 3,389,021                      June 18, 1968

Charles G. Easter et al.

It is certified that error appears in the above identified patent and that said Letters Patent are hereby corrected as shown below:

In the heading to the printed specification, lines 5 to 7, "assignors to The Steel Company of Canada, Limited, Hamilton, Ontario, Canada, a corporation of Canada" should read -- assignors, by mesne assignments, to Morgan Construction Company, Worcester, Mass. --. Column 2, line 7, the equation should appear as shown below:

$$4FeO \longrightarrow Fe_3O_4 + Fe$$

Signed and sealed this 6th day of January 1970.

(SEAL)
Attest:

EDWARD M. FLETCHER, JR.              WILLIAM E. SCHUYLER, JR.
Attesting Officer                      Commissioner of Patents